United States Patent
Fussell

[15] 3,693,028
[45] Sept. 19, 1972

[54] SYSTEM FOR THE DETECTION AND VALIDATION OF SIGNAL PEAKS

[72] Inventor: Richard L. Fussell, Chester Springs, Pa.

[73] Assignee: Burroughs Corporation, Detroit, Mich.

[22] Filed: Sept. 30, 1970

[21] Appl. No.: 76,905

[52] U.S. Cl. .................307/235, 307/247, 307/260, 328/31, 328/110, 328/117, 328/150
[51] Int. Cl. ......H03k 5/08, H03k 5/153, H03k 17/30
[58] Field of Search......307/232, 235, 247, 260, 261, 307/264; 328/31, 109, 110, 115, 116, 117, 60, 61, 62, 132, 150, 151, 203, 206

[56] References Cited

UNITED STATES PATENTS

| | | |
|---|---|---|
| 3,122,729 | 2/1964 | Bothwell et al. ........328/115 X |
| 3,435,424 | 3/1969 | Schira et al. ............328/109 X |
| 3,456,201 | 7/1969 | Zrubek ..................328/151 X |
| 3,541,457 | 11/1970 | Leighty..................307/235 X |
| 3,546,482 | 12/1970 | Bader et al.............328/116 X |
| 3,559,178 | 1/1971 | Hibner et al. ..........328/150 X |

*Primary Examiner*—Donald D. Forrer
*Assistant Examiner*—L. N. Anagnos
*Attorney*—Carl Fissell, Jr.

[57] ABSTRACT

A signal peak detection system is disclosed which in a preferred embodiment utilizes the initial actuation of one of a pair of regenerative threshold detectors by an input analog signal, the actuated detector providing threshold information to decision logic for initiating signal analysis processing at a suitable time prior to the occurrence of the signal peak. The system also includes storage units responsive to the respective states of the detectors, and gating circuits for providing an indication of the occurrence of an over-the-peak condition. Depending upon the nature of the input signal, such indication results either from the recovery of the detector initially actuated, or by the concurrent actuation of both detectors as reflected by the presence of output signals from the associated storage units. An over-the-peak output signal is generated by the system only when predetermined characteristics of the input signal have been validated by the decision logic.

8 Claims, 4 Drawing Figures

INVENTOR.
RICHARD L. FUSSELL

INVENTOR.
RICHARD L. FUSSELL

SYSTEM FOR THE DETECTION AND VALIDATION OF SIGNAL PEAKS

CROSS REFERENCE TO RELATED APPLICATIONS

The basic circuit element, a threshold switch, employed in the present invention, as well as the following reference application, is described and claimed in application Ser. No. 679,965, now U. S. Pat. No. 3,546,482, "Signal Peak Detection System," by Clifford J. Bader and Richard L. Fussell. A second copending application Ser. No. 68,177 for "Sensitive Threshold and Over-the-Peak Signal Detection Systems," filed in the name of Richard L. Fussell, discloses related detector circuits and systems. Both of these applications are assigned to the same assignee as the present application.

BACKGROUND OF THE INVENTION

The invention disclosed herein was made in the course of, or under a contract with, the Department of the Navy.

The signal peak detection system described and claimed in the reference Ser. No. 679,965 application, comprises a plurality of threshold switches which provide an output level transition when the absolute amplitude of the input signal information begins to decline after passing through a maximum value. Said second copending application mentions that while the system described in application Ser. No. 679,965 is suited for a variety of applications, it does not exhibit the capability of validating the input signal characteristics as a condition for generating an over-the-peak output indication.

In accordance with the present invention and that described in said second copending application, circuits and techniques are provided which considerably extend and expand the detector system of the reference Ser. No. 679,965 application. The systems described and claimed in said second application, as well as the system described and claimed herein, provide an optimum hardware and functional interface between low-level, long period analog circuits and digital decision logic, thereby performing sensitive analog-to-digital conversion. Moreover, both initial and final information is applied to the decision logic. The former effects signal analysis processing at an appropriate time before the signal peak occurs and the latter indicates a return to the analog steady state condition where no input signal is present. The systems described have the capability of limiting the number of the decision logic "start processing" signals to those which have a high probability of satisfying peak detection conditions. Also, the systems provide a direct information constraint to the decision logic that the input signal possesses invalid characteristics. The "digital" signal applied to the decision logic is designed to have a fast rise and fall characteristic with minimum noise content, although the analog signal may be extremely slow and incorporate significant electrical noise.

The full latch system described in said second copending application provides highly efficient peak signal detection suitable for a wide variety of applications. However, it should be noted that in applications where the input signal amplitudes are close to minimum circuit thresholds, the full latch system provides an over-the-peak recognition which is considerably removed from the true signal peak. The present detection system is particularly useful in those special applications where the last-mentioned condition cannot be tolerated. Other features of the present invention include symmetrical performance with respect to the applied analog signal; minimum dependence on semiconductor critical parameters; and low voltage, low current operation.

SUMMARY OF THE INVENTION

In accordance with a preferred embodiment of the present invention, an electrical analog signal is applied both in-phase and phase-inverted to the respective input terminals of a pair of threshold detectors. Each of these detectors comprises an input current amplifying stage which serves as a threshold switch, and an output current amplifying stage coupled to the input stage to provide a regenerative action. The status of each of the detectors in response to the input signal is stored in appropriate means, such as a flip-flop, and is monitored by logic elements to generate an output peak detection signal close to the true signal peak.

In operation, the input threshold switch stages of the detectors are in a conducting state in the absence of an input signal. An applied signal of suitable amplitude causes a first threshold switching in which one of said threshold switch stages is driven to nonconduction. The transition to nonconduction is extremely rapid due to the regenerative action of the detector stages. The switching of the input stage to nonconduction results in the setting of a flip-flop associated therewith. A second threshold switching occurs as the analog signal begins to decline after passing through its peak, and the other detector input stage is ultimately driven to nonconduction. In the full-latch detection system described and claimed in the reference application, "Sensitive Threshold and Over-the-Peak Signal Detection Systems," the state of the first detector whose input stage is initially switched to nonconduction is maintained by the associated latch circuit until the second detector is driven to the same state as the first. At this time, the similarity of states and corresponding outputs of the detectors are recognized as an occurrence of the over-the-peak condition.

The technique employed in the present system does not depend on the achievement of similarity of states in the detectors before an over-the-peak indication can be generated. The philosophy of the technique is based upon the recognition that when an applied analog signal whose amplitude is approximately that of the circuit threshold of the input detector stage exceeds its peak amplitude and begins to diminish, the threshold detector of the symmetrical pair which was initially switched to nonconduction by the input signal begins to recover, that is, return to conduction. It is this recovery of the input stage threshold switch which is utilized as a true indication of the attainment of an over-the-peak condition. Thus it is apparent, that in the present system it is not necessary to wait until the input stage of the other detector has been switched from a conducting to a nonconducting state before a peak indication is generated. Accordingly, peak detection close to the true signal peak and close to the initiation threshold of the decision logic is implemented by the detection system of the present invention.

The present system also includes decision logic and means for its initiation, whereby the characteristics of the the input analog signal are analyzed and predetermined conditions met prior to the generation of a system output indicative of an over-the-peak condition. The decision logic also supplies reset control commands to the threshold detectors and associated storage means on a system demand basis.

DESCRIPTION OF THE PREFERRED EMBODIMENT

Figure 1:
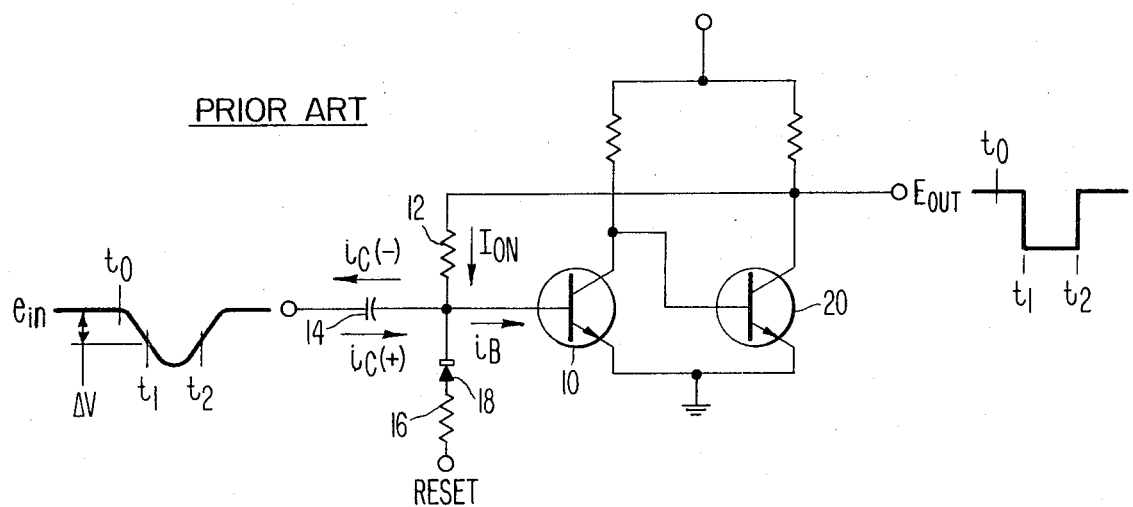
FIG. 1 is a schematic diagram of a regenerative threshold detector suitable for use in the present detection system.

The threshold detector of the present invention depicted in FIG. 1 includes as a basic circuit element a threshold switch comprised of transistor 10, which element is also used in the inventions of both reference applications. The circuit provides the capability of generating switching signals at very low analog signal amplitudes, for example, less than 10 millivolts peak, and very low frequencies, less than 0.1hz. The current consumed by the basic switch is less than 5 microamperes. Although the operation of the basic switch and its regenerative configuration which employs an additional current amplifying stage, such as transistor 20 in FIG. 1, have been described in detail in the reference application, it is believed helpful at this time to review their characteristics.

With reference to FIG. 1, transistor 10 is normally in a conducting state in the absence of an applied analog signal $e_{in}$ as a result of a small dc bias current $I_{ON}$. The bias current is supplied by way of resistor 12 which couples the collector of transistor 20 to the base of transistor 10. Transistor 20 is normally nonconducting at this time and the detector output voltage $E_{OUT}$ appearing on the collector electrode thereof is "high." The analog signal of interest is coupled to transistor 10 by way of an appropriate capacitor 14 and hence in the steady state prior to time $t_0$ results in no additional current contribution. That is, the capacitor current $i_c = 0$ where dv/dt of the input signal is also equal to zero. The capacitive coupling also permits a generous tolerance for analog steady state voltage conditions over a wide dc dynamic range. At time $t_0$, the input voltage starts to go negative. The switching of transistor 10 occurs only when the analog signal begins to develop a sufficiently negative dv/dt. Under these conditions capacitive current, $i_c(-) = -C\, dv/dt$, occurs and since the capacitive current is greater than the bias current $I_{ON}$ the transistor conduction can no longer be sustained and switching commences at time $t_1$. As transistor 10 begins to cease conduction and transistor 20 to conduct, the current $I_{ON}$ through resistor 12 is reduced essentially to zero.

Thus the cessation of conduction in transistor 10 at time $t_1$ is extremely rapid as indicated by the fall time of the leading edge of the output voltage, $E_{OUT}$ waveform. $E_{OUT}$ is "low" at this time. A knowledge of the transistor parameters defines a predictable switching point since the device will not turn off instantaneously when the base current $I_B$ becomes zero. This fact is illustrated in FIG. 1 by the negative ramp of the input signal transition voltage $\Delta V$, which results in a transistor base voltage change, $-\Delta V_{BE}$, in addition to a base current change. As a result, the precise switching conditions are $$de_{in}/dt \geq I_{ON}/C$$

and $$-\Delta V \geq V_{BE(Sw)}$$

where $V_{BE(Sw)}$ is the required device transition voltage for immediate switching. Control of the device base transition voltage requirement is best achieved by specifying the transistor collector-to-emitter saturation voltage which is a readily measurable and process-controllable parameter.

It should be noted that for an applied signal positive slope the capacitor current $i_c(+) = +C\, dv/dt$ merely adds to the bias current $I_{ON}$ thereby increasing the transistor base current and maintaining the transistor in a conducting state. When the input signal has passed through its negative peak, a positive-going voltage is applied to the base of transistor 10. At time $t_2$ transistor 10 recovers, i.e., resumes conduction and current $I_{ON}$ flows through resistor 12 as transistor 20 reverts to its nonconductive state.

Also included in the threshold detector of FIG. 1 is a reset current path comprised of resistor 16 and diode 18 which couples a source of reset current to the base of transistor 10. When the reset control signal is "high," a current designed to be significantly larger than $I_{ON}$ will also flow to the base of transistor 10. The presence of the reset-controlled base current will tend to cause transistor 10 to assume its steady state conduction condition.

The detection system of the present invention is not to be considered limited to the use of the regenerative detector configuration of FIG. 1. For example, the input stage threshold switch itself, as depicted in the reference applications, may serve as the detector. In the absence of the regenerative second stage, the dc bias current $I_{ON}$ for the switch, may be drawn through an appropriate resistance from the source of supply potential. This circuit structure results in the bias current being ever-present, with the result that the diminution of the $-dv/dt$ input as a negative-going input pulse approaches its peak amplitude, could result in the recovery of the switch prior to, or at, the actual peak. This is in contrast to the consistently over-the-peak indication provided by the regenerative detector. It is apparent therefore that if the application of the detection system is not critical as to the precise point at which the peak detection occurs, the simple threshold switch will suffice as a detector.

Figure 2:
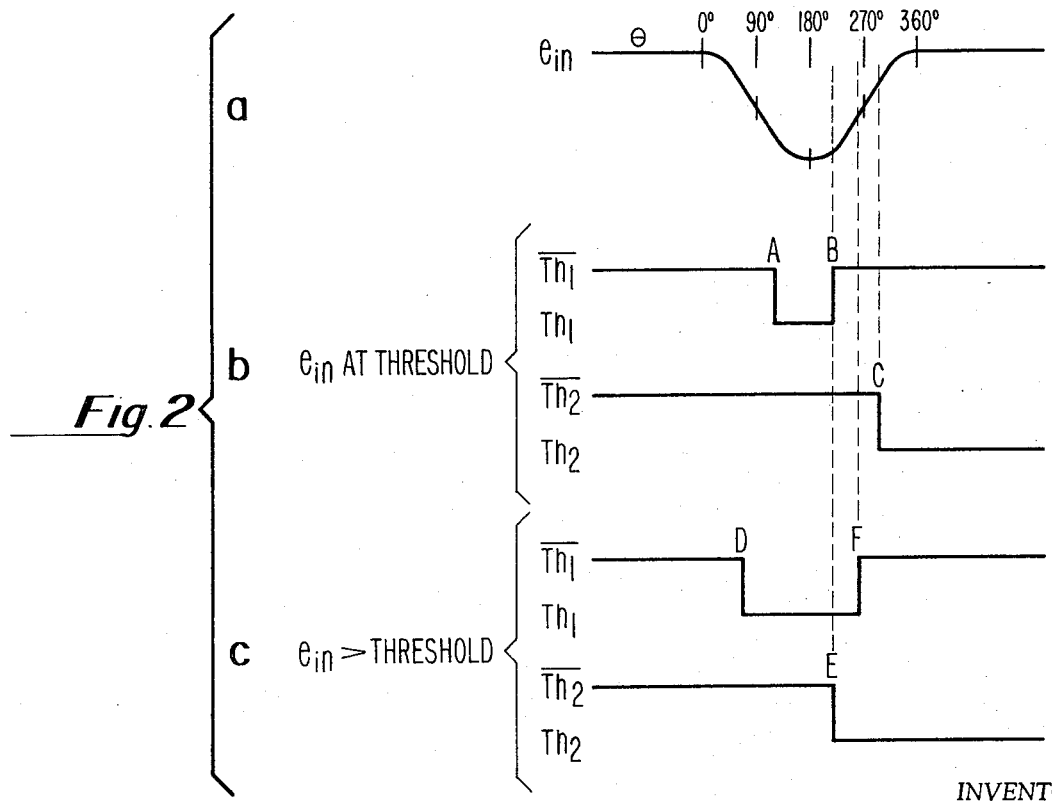
FIGS. 2a–2c illustrate a representative input signal and the waveforms resulting from the switching action of the threshold detector stages for different amplitudes.
Figure 3:
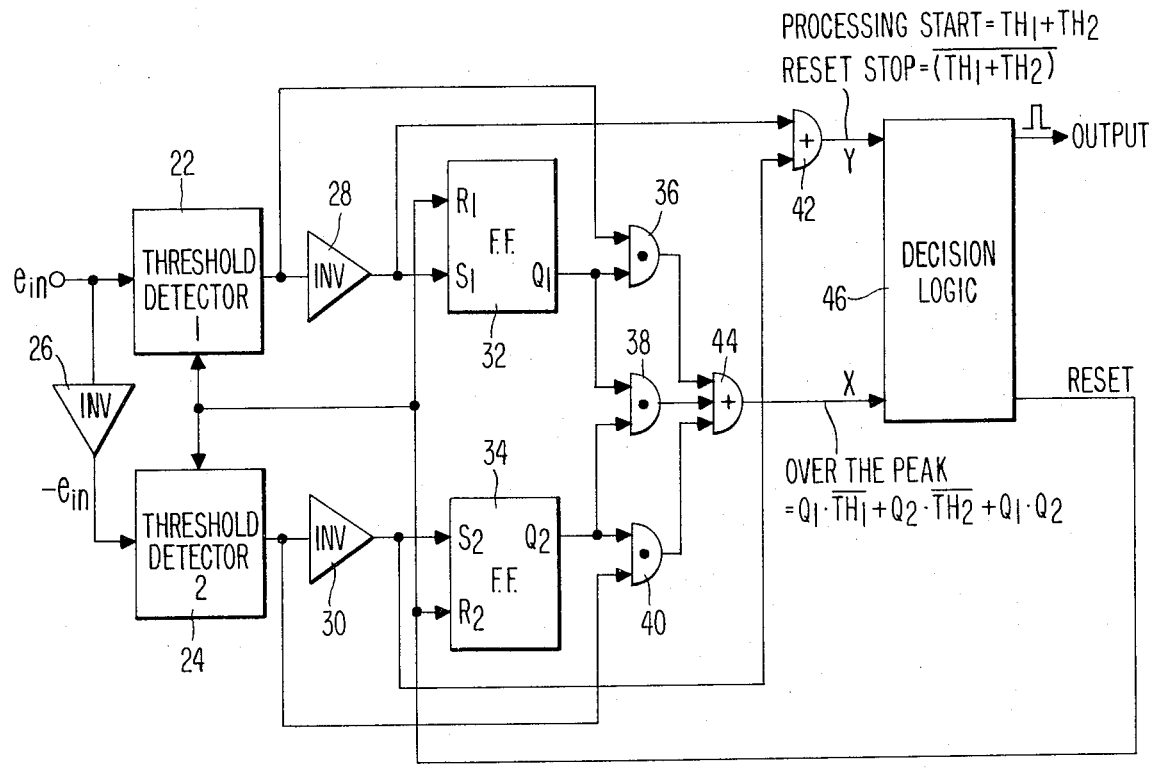
FIG. 3 is a block diagram of a system configuration utilizing a pair of the threshold detectors depicted in FIG. 1.

FIGS. 2a–2c illustrate the signal switching conditions which occur in the system configuration of FIG. 3 for a single peak analog signal. FIG. 2a illustrates a typical input signal designated $e_{in}$. The amplitude of the analog signal $e_{in}$ may be specified at any given time with reference to the angle $\theta$ covering zero degrees to 360°, the entire period of the input signal. The waveforms of FIG. 2b illustrate the switching of a pair of threshold detectors of the type depicted in FIG. 1. The bilevel outputs for the detectors are designated respectively $\overline{Th_1}$, $Th_1$ and $\overline{Th_2}$, $Th_2$, for the condition where the amplitude of the input signal, $e_{in}$, is at the switching threshold amplitude of the input detector stage. The switching waveforms of FIG. 2c illustrate the switching conditions for an analog signal amplitude which is substantially greater than the threshold amplitude, or approximately 2 or 3 times that assumed in connection with the waveforms of FIG. 2b.

The significance of the present invention will become more fully apparent from a consideration of the complete system implementation of FIG. 3 in conjunction with the waveforms of FIGS. 2a–2c inclusive. Threshold Detector 1 and Threshold Detector 2, reference numerals 22 and 24 respectively in FIG. 3 are each identical to the detector circuit of FIG. 1. The designations $\overline{Th_1}$, $Th_1$ and $\overline{Th_2}$, $Th_2$ represent the bilevel outputs from the respective detectors 22 and 24. A signal phase-inverter 26 provides the push-pull drive required by the detection system. It should be understood that if the source itself of the input analog signal $e_{in}$ provides such a drive, the signal inverter 26 is unnecessary and can be eliminated. If a phase-inverter circuit must be used, numerous varieties of this circuit, well known to those skilled in the electronics art, may be successfully employed. It has been found, for example, that the use of a stabilized, feedback-type, unity gain, inverting amplifier is particularly advantageous because of the inherent low output impedance and stability of such a configuration. The system of FIG. 3 also includes two additional inverters 28 and 30, a pair of flip-flops 32 and 34 for producing output signals $Q_1$ and $Q_2$ respectively, three AND gates designated 36, 38 and 40 respectively, two OR gates 42 and 44, and a Decision Logic functional block 46. The output from OR gate 42 is designated the "Y" signal and indicates to the decision logic both the condition for processing start, $(Th_1 + Th_2)$ and the condition for reset stop, $(\overline{TH_1} + \overline{Th_2})$. The output from OR gate 44, designated the "X" signal, indicates to logic three conditions, each of which represent an over-the-peak occurrence, namely $Q_1 \cdot \overline{Th_1} + Q_2 \cdot \overline{Th_2} + Q_1 \cdot Q_2$.

In order to establish a convention for the logical expression and diagrams found herein, $Th_1$ (or $Th_2$) represents a "low" output from a detector corresponding to the $E_{OUT}$ in FIG. 1 for the condition where the input threshold switch (transistor 10 of FIG. 1) of the associated detector is in a nonconducting state. Likewise, $\overline{Th_1}$ (or $\overline{Th_2}$) represents a "high" level output from a detector which corresponds to the $E_{OUT}$ in FIG. 1 for the condition where the input threshold switch of the detector is in a conducting state, as during steady state conditions. Outputs $Q_1$ and $Q_2$, from flip-flops 32 and 34, as well as outputs from all of the AND and OR gates depicted in the drawing, when present, are to be considered "high" level outputs.

The system conditions of the configuration of FIG. 3 with respect to the analog signal of FIG. 2a are as follows: during steady state operation where the input signal angle $\theta$ is less than zero degrees, flip-flops 32 and 34 are each in the reset state and there are no $Q_1$, $Q_2$ outputs, that is, $(\overline{Q}_1 \cdot \overline{Q}_2)$. The outputs of detectors 22 and 24 are respectively $\overline{Th_1}$ and $\overline{Th_2}$, which are "high", and thereby cause the outputs of inverters 28 and 30 coupled respectively thereto to be "low." Accordingly flip-flops 32 and 34 remain in their respective reset states. There are no "X" and "Y" signal outputs from gates 42 and 44 and no reset or decision logic activity during this time.

A first threshold switching occurs when the input signal angle $\theta$ is greater than zero degrees but less than 180°. For an applied signal $e_{in}$ with a peak amplitude at the input detector stage minimum response level, the input stage (transistor 10 of FIG. 1) of threshold detector 22 will experience a negative-going input and will actuate in the region just beyond the signal 90° point. Such actuation will cause the output of the last-mentioned detector to go from the $\overline{Th_1}$ to the $Th_1$ level commencing at point A as indicated in FIG. 2b. During the time that the input signal of FIG. 2a is negative-going, inverter 26 applies a +dv/dt input to threshold detector 24 and there is no switching of the input state thereof, as illustrated by the "high" level $\overline{Th_2}$ output of FIG. 2b.

The switching of the input stage of detector 22 at point A causes inverter 28 to apply a "high" level pulse to the $S_1$ set terminal of flip-flop 32 which causes the latter to switch to the set state. Concurrently, a pulse is applied to OR gate 42 which then passes a "Y" signal to the Decision Logic 46 to start the signal processing. The $Q_1$ output of flip-flop 32 is applied to one of the pair of input terminals of AND gate 36 but since the other input to this gate is "low", namely $Th_1$, there is no output from this gate. Likewise, no outputs are present on the respective output terminals of AND gates 38 and 40 and there is no "X" signal output from OR gate 44.

When the input signal angle passes the 180° point, the actual signal peak, the detector 22 input stage experiences a +dv/dt input and in accordance with the operation described hereinbefore in connection with FIG. 1, the input stage resumes conduction as illustrated by the rise from the $Th_1$ output level to the $\overline{Th_1}$ level at point B of FIG. 2b.

The recovery of the input stage of detector 22 and the generation of the $\overline{Th_1}$ output level, results in "high" level inputs, $Q_1 \cdot \overline{Th_1}$ to AND gate 36, with a resultant output there-from to an input terminal of OR gate 44. The last-mentioned gate generates an "X" signal indicative of an over-the-peak occurrence which signal is applied to Decision Logic.

The foregoing operation emphasizes the feature of the present invention whereby, under the condition where the input signal is close to the detector input threshold, an over-the-peak indication is generated close to the true peak by observing the recovery of the detector stage initially switched by the −dv/dt signal input. At time B, although the input stage of detector 24 had been subjected to a −dv/dt input, the latter was still not of sufficient magnitude to switch the stage to a nonconducting state. If coincidence of similar detector outputs or states had been made the criterion for peak indication (as in the system of the reference applications) such indication would not have come until point C of FIG. 2b. Thus, at point C, the output level from detector 24 switches from $\overline{Th_2}$ to $Th_2$, flip-flop 32 remains set as the result of the previous action of detector 22, $Q_1 \cdot Q_2$ inputs to AND gate 38 would have been available to cause gate 44 to generate an over-the-peak indication. Actually, as will be apparent from the following discussion involving a substantially larger amplitude input analog signal, and with reference to the waveforms of FIG. 2c, the $Q_1 \cdot Q_2$ outputs will actually occur prior to the $Q_1 \cdot \overline{Th}_1$ outputs. It will be apparent from the foregoing that the present detection system will function in an optimum manner for different input signal conditions.

Considering FIG. 3 in connection with FIG. 2c, the steady state conditions are the same as in FIG. 2b. At a time when the input signal angle $\theta$ is between zero degrees and 90°, the threshold switch stage of detector 22 is switched from a conducting to a nonconducting state, as illustrated at point D of FIG. 2c, the output of the detector falling from $\overline{Th}_1$ to $Th_1$. A "Y" signal for processing start is applied to the decision logic 46 at this time. Thus far, the operation is similar to that described in connection with FIG. 2b, except that the required $-dv/dt$ of the larger amplitude input signal has driven the input stage of detector 22 to nonconduction at an earlier time.

As the input signal angle $\theta$ passes 180°, a $-dv/dt$ input is applied to the input stage of detector 24, which tends to drive the stage to nonconduction. Concurrently, a $+dv/dt$ input is applied to the input stage of detector 22, tending to cause its recovery. In contrast to FIG. 2b, the recovery of detector 22 requires a longer period concomitant with the considerably greater negative excursion of the signal previously applied thereto. The result of this situation is that at point E the input stage of detector 24 is driven to nonconduction, its output falls from $\overline{Th}_2$ to $Th_2$, a positive-going pulse is applied to the $S_2$ terminal of flip-flop 34 by inverter 30, thereby setting the flip-flop and generating a $Q_2$ pulse. Thus, at point E, $Q_1 \cdot Q_2$ pulses are applied to the input terminals of AND gate 38, whose output passes through OR gate 44 to generate an "X" over-the-peak signal. It is apparent that the subsequent recovery of detector 22 at point F, producing the $Q_1 \cdot \overline{Th}_1$ signals which generated an over-the-peak indication under the input signal conditions of FIG. 2b are not the preferred mode of operation under the conditions of FIG. 2c.

The operation of the detectors in the system of FIG. 3, for an input signal as shown in FIG. 2a may be summarized as follows. When an input signal of minimal amplitude crosses over the peak, the recovery of detector 22 occurs prior to the actuation of detector 24; the AND gate 36 inputs become $\overline{Th}_1 \cdot Q_1$, and via the peak detection OR gate 44 result in the desired peak detection signal to the decision logic. For large amplitude signals where threshold recovery in detector 22 does not occur before the actuation of detector 24, inputs $Q_1 \cdot Q_2$ to AND gate 38 will provide the earliest peak detection. If a signal of minimal amplitude and opposite polarity to that depicted in FIG. 2a is applied to the system of FIG. 3, detector 24 and flip-flop 34 provide inputs $\overline{Th}_2 \cdot Q_2$ to AND gate 40 to effect the generation of the "X", over-the-peak signal.

The design of the Decision Logic 46 will depend upon particular operating requirements. Depending on the design, a Reset Control signal will be applied to both threshold detectors 22 and 24 and their associated flip-flops 32 and 34 at a time after logic initiation and/or a peak detection recognition. The Reset Control will establish in combination with the input signal, "-turn-on" conditions for the detector input stages and reset of the flip-flops 32 and 34. Since the threshold detector output signals will not return to steady state levels until the input stages are fully conducting, these output signals accurately define the point at which the Reset Control signal may be terminated.

Figure 4:
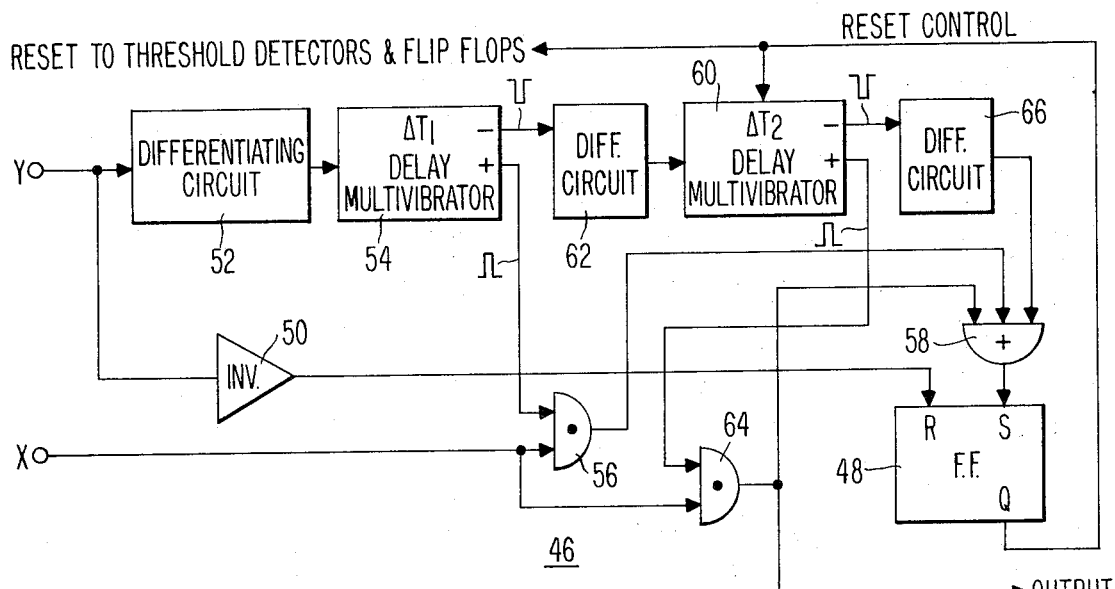
FIG. 4 is a logic diagram suitable for use in providing the "decision logic" for the system of FIG. 3.

FIG. 4 is a logic diagram which may be utilized as the Decision Logic block 46 of FIG. 3. It should be understood that the diagram of FIG. 4 has been included merely for purposes of example and that as mentioned hereinbefore, the decision logic may take numerous forms depending upon the application of the detector system. The particular form of decision logic to be employed rests with, and is well within the skill of, the logical designer. Accordingly, the present invention should not be considered limited by the particular design illustrated in FIG. 4.

It is the purpose of the decision logic of FIG. 4 to validate the characteristics of the input analog signal prior to generating an output indicative of an over-the-peak detection. For example, assuming prior knowledge of the frequency and waveform characteristics of the input signals expected to be received by the detector system of FIG. 3, the occurrence of an X (over-the-peak) signal from OR gate 44, at a time too soon after a Y (initiate logic) signal from OR gate 42, is treated as an invalid condition and no output "over-the-peak" signal is generated by the detector system. Such invalid condition may result from a variety of causes, for example, a spurious noise spike superimposed on the analog signal, or an analog signal having a higher frequency than that acceptable in a particular application — such conditions causing the decision logic to ignore the presence of the X signal. The flexibility of the decision logic design is further emphasized by the last-mentioned situation where readjustment of the decision logic parameters may be made to validate such high frequency input signals, if desired.

The processing of the X and Y signals by the decision logic of FIG. 4 proceeds as follows. In a steady-state condition, neither X nor Y signals are present (the levels on the X and Y terminals of FIG. 4 are "low"), the flip-flop 48 is in a reset condition as a result of the "high" voltage level applied to the R (reset) terminal thereof by inverter 50.

It will be assumed for purpose of explanation that the applied analog signal is that depicted in FIG. 2a, and that in accordance with the operation of the system of FIG. 3 as described hereinbefore, a Y signal is applied from OR gate 42 to the Y terminal of the decision logic. This Y signal is acted upon by the differentiating circuit 52 and the output thereof initiates a "check period" by triggering a delay multivibrator 54 to provide a predetermined $\Delta T_1$ pulse period. The inverted steady-state signal applied to the R terminal of flip-flop 48 is also removed at this time. During the $\Delta T_1$ period no valid X signal is anticipated. If an X signal from OR gate 44 does appear, it is coupled to the X terminal of the decision logic, and is applied in coincidence with the positive pulse output of delay multivibrator 54, to AND gate 56. The output from AND gate 56 is coupled through OR gate 58 to the S (Set) terminal of flip-flop 48. The setting of flip-flop 48 causes a Reset Control signal Q to be generated by the flip-flop, which signal is applied in common to the respective reset terminals of the threshold detectors 22 and 24 and reset terminals $R_1$ and $R_2$ of the flip-flops 32 and 34. The duration of the Reset Control signal is a function of the analog signal and the recovery time for the input detector stage. The Reset Control signal is also applied to a second delay multivbrator 60 to inhibit its operation. Differentiating circuit 62 differentiates the output negative pulse from delay multivibrator 54 and normally triggers delay multivibrator 60. However, in the example under consideration, where an invalid X signal occurred during $\Delta T_1$, the presence of a Reset Control signal prevents the differentiated output of circuit 62 from triggering delay multivbrator 60 and initiating a $\Delta T_2$ pulse period.

In a second situation, it will be assumed that a Y initiate logic signal has occurred and that no X signal appeared during the first time period $\Delta T_1$. A negative pulse from delay multivibrator 52 is applied to differentiating circuit 62 which generates a positive trigger pulse corresponding in time to the trailing edge of said negative pulse. This trigger pulse is applied to delay multivibrator 60 and serves to initiate a second pulse period $\Delta T_2$. An X signal occurring during the $\Delta T_2$ period is regarded as valid.

It will be assumed that an X signal from OR gate 44 is applied to the X terminal of the Decision Logic during $\Delta T_2$. The X signal is applied to AND gate 64 in coincidence with a positive signal from delay multivibrator 60. An output signal from AND gate 64 represents an OUTPUT from the detector system indicating that an over-the-peak condition has occurred. Additionally, the AND gate 64 output effects a setting of flip-flop 48, which in turn results in the Reset Control signal being applied to the reset terminals of threshold detectors 22 and 24, and to delay multivibrator 60, to terminate the pulse period $\Delta T_2$.

If in a third situation, no X signal occurs during the $\Delta T_2$ time, the differentiating circuit 66 which is operatively connected to receive the negative pulse output from delay multivibrator 60 generates a trigger pulse corresponding in time to the trailing edge of said negative pulse. The trigger pulse from differentiating circuit 66 passes through OR gate 58 and sets flip-flop 48, which generates the Reset Control signal. The Reset Control signal is applied to threshold detectors 22 and 24 and is present until the analog signal input conditions are such that no Y signals exist. Stated another way, Reset Control is present until the input detector stages have resumed their steady state conduction and the $\overline{Th}_1$ and $\overline{Th}_2$ output levels of the detectors are present. With a return to steady state conditions, there is no "Y" signal from OR gate 42 and inverter 50 of the decision logic returns flip-flop 48 to the reset state, thereby terminating the Reset Control signal.

It should be apparent from the foregoing description of the invention and its mode of operation that there is provided a peak signal detection system in which the occurrence of the peak indication substantially close to the true signal peak, makes the system useful in a wide variety of applications. The circuit configurations employed utilize a minimum number of components and provide very low current operation of less than 20 microamperes.

It should be understood that changes and modifications of the arrangements described herein may be required to fit particular operating requirements. These changes and modifications, in so far as they are not departures from the true scope of the present invention, are intended to be covered by the claims appended hereto.

What is claimed is:

1. A signal peak detection system for receiving an input push-pull electrical signal comprising first and second threshold detectors each having an input and an output terminal, the in-phase and phase-inverted forms of said input signal being applied respectively to the input terminals of said threshold detectors, each of said detectors including an input current amplifying stage, first and second bistable means each having set and reset input terminals and an output terminal, means coupling the output terminals of said first and second detectors respectively to the set terminals of said first and second bistable means, a capacitor connecting said input terminal of each detector to its associated current amplifying stage, each of said input stages being normally in a conducting state and each of said first and second bistable means being in a reset state in the absence of said electrical signal, the degree of conduction of the input current amplifying stages being a function of the respective instantaneous amplitudes of said in-phase and phase-inverted forms of said electrical signal and the electrical charges on the capacitors associated therewith, one of said forms of input signal initially causing the input stage in said first detector to cease conduction, the other of said forms of input signal concurrently causing increased conduction in the input stage of said second detector and the charging of its associated capacitor, said first bistable means being switched from the reset state to the set state in response to the cessation of conduction of the input stage of said first detector, a plurality of AND gates each having a pair of input terminals and an output terminal, means coupling the output terminals of said first detector and said first bistable means to the respective input terminals of a first of said AND gates, means coupling the output terminals of said first and second bistable means to the respective input terminals of a second of said AND gates, means coupling the output terminals of said second detector and said second bistable means to the respective input terminals of a third of said AND gates, the concurrent presence of predetermined signal levels on the pair of input terminals of any one of said AND gates providing a gate output signal indicative of the attainment of a peak condition by said input signal.

2. A signal peak detection system as defined in claim 1 wherein said first and second bistable means are respectively first and second flip-flop circuits.

3. A signal peak detection system as defined in claim 2 wherein the amplitude of said input signal is at the threshold of the detector input stage, the passage of said input signal through its maximum absolute amplitude resulting initially in the return of the input stage of said first detector to its original conducting stage, said first flip-flop circuit being unaffected by the return of the input stage of said first detector to conduction and remaining in the set state, the signals appearing respectively on the output terminals of said first detector and said first flip-flop circuit being of said predetermined level, and being applied concurrently to the respective input terminals of the first of said AND gates to provide an output peak indication therefrom.

4. A signal peak detection system as defined in claim 2 wherein the amplitude of said input signal is substantially greater than the threshold of the detector input stage, the passage of said input signal through its maximum absolute amplitude resulting initially in the return of the input stage of said second detector to its normal state of conduction and the subsequent discharge of its associated capacitor, whereby said last-mentioned stage is driven to a nonconducting state, said second flip-flop circuit being switched from the reset state to the set state in response to the cessation of conduction of the input stage of said second detector, both said first and second flip-flop circuits being in the set state at this time, the signals appearing respectively on the output terminals of said first and second flip-flop circuits being of said predetermined level, and being applied concurrently to the respective input terminals of the second of said AND gates to provide an output peak indication therefrom.

5. A signal peak detection system as defined in claim 2 wherein each of said threshold detectors include an output current amplifying stage coupled to said input stage in a regenerative configuration, each of said stages having an input, an output and a control electrode, each of said capacitors being connected between a detector input terminal and the control electrode of the input stage associated with that detector, impedance means for coupling said input stage control electrode to said output stage output electrode, impedance means for coupling respectively the output electrodes of said stages to a source of supply potential, the input electrodes of said stages being connected in common to a source of reference potential, said output terminal of each of said detectors corresponding electrically to the output electrode of its output stage, and reset means comprising for each of said detectors the series combination of impedance means and a diode for coupling the control electrode of said input stage to a source of reset control current.

6. A signal peak detection system as defined in claim 5 wherein said current amplifying stages are transistors, and said input, output and control electrodes are respectively emitter, collector and base electrodes.

7. A signal peak detection system as defined in claim 6 further including decision logic means having first and second input terminals, a reset control terminal and a system output terminal, first and second OR gates each having a plurality of input terminals and an output terminal, means coupling the output terminals of said first and second OR gates respectively to the first and second input terminals of said decision logic means, means coupling the signals appearing respectively on the set terminals of said first and second flip-flop circuits to a pair of input terminals of said first OR gate, the signal levels appearing on the output terminals of said first OR gate being applied to said decision logic means for selectively initiating processing activity therein and terminating the generation of reset control current thereby, means for coupling said reset control terminal of said decision logic means to said reset means of each of said detectors and to the reset terminals of each of said first and second flip-flop circuits, the output terminals of said plurality of AND gates being coupled respectively to the input terminals of said second OR gate, the presence of a signal on an input terminal of said second OR gate allowing said gate to pass a peak indication signal to said decision logic means, said decision logic means providing at said system output terminal an output signal indicative of a valid detection.

8. A signal peak detection system as defined in claim 7 wherein said decision logic means comprises a third flip-flop circuit having set and reset terminals, inverter means coupling said first input terminal of said decision logic means to the reset terminal of said third flip-flop circuit, a first differentiating circuit coupled to said first decision logic input terminal, a first delay multivibrator having an input terminal coupled to said first differentiating circuit and a pair of output terminals for providing pulse outputs of opposite polarity and predetermined duration in response to a trigger pulse from said first differentiating circuit, fourth and fifth AND gates each having a pair of input terminals and an output terminal, a third OR gate having first, second and third input terminals and an output terminal, the output terminal of said third OR gate being coupled to the set terminal of said third flip-flop circuit, means coupling said second decision logic input terminal and one of said output terminals of said first delay multivibrator to the respective input terminals of said fourth AND gate, the output terminals of said fourth AND gate being coupled to said first input terminal of said third OR gate, a second differentiating circuit coupled to the other output terminal of said first delay multivibrator, a second delay multivibrator having an input terminal coupled to said second differentiating circuit and a pair of output terminals for providing pulse outputs of opposite polarity and predetermined duration in response to a trigger pulse from said second differentiating circuit, means coupling said second decision logic input terminal and one of said output terminals of said second delay multivibrator to the respective input terminals of said fifth AND gate, the output terminal of said fifth AND gate corresponding electrically to said system output terminal and being coupled to said second input terminal of said third OR gate, a third differentiating circuit coupled to the other output terminal of said second delay multivibrator, the output of said third differentiating circuit being coupled to said third input terminal of said third OR gate, the setting of said third flip-flop circuit in response to an output signal from said third OR gate causing said third flip-flop circuit to generate a reset control pulse on said reset control terminal, said reset pulse being applied concurrently to said second delay multivibrator to inhibit the operation thereof, and to the reset means of both said threshold detectors, and to the reset terminals of said first and second flip-flop circuits.

* * * * *